US007664281B2

(12) United States Patent
Merks

(10) Patent No.: US 7,664,281 B2
(45) Date of Patent: Feb. 16, 2010

(54) METHOD AND APPARATUS FOR MEASUREMENT OF GAIN MARGIN OF A HEARING ASSISTANCE DEVICE

(75) Inventor: Ivo Leon Diane Marie Merks, Eden Prairie, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 671 days.

(21) Appl. No.: 11/276,543

(22) Filed: Mar. 4, 2006

(65) Prior Publication Data

US 2007/0217638 A1 Sep. 20, 2007

(51) Int. Cl.

*H04R 25/00* (2006.01)
*H04R 29/00* (2006.01)
*H04B 15/00* (2006.01)

(52) U.S. Cl. .......................... 381/317; 381/60; 381/93; 381/312; 381/318; 381/320; 381/321

(58) Field of Classification Search .................. 381/60, 381/312, 317, 318, 320, 321
See application file for complete search history.

(56) References Cited

U.S. PATENT DOCUMENTS 5,016,280 A * 5/1991 Engebretson et al. ....... 381/320
5,357,251 A 10/1994 Morley, Jr. et al.
5,475,759 A 12/1995 Engebretson
6,118,877 A * 9/2000 Lindemann et al. ........... 381/60
6,134,329 A 10/2000 Gao et al.
2002/0176584 A1* 11/2002 Kates .......................... 381/60

OTHER PUBLICATIONS

Egelmeers, G. P., "Real Time Realization Concepts of Large Adaptive Filters", *Ph.D. Thesis, Technische Universiteit Eindhoven*, (2005), 215 pgs.
Freed, D. J., et al., "Comparative Performance of Adaptive Anti-Feedback Algorithms in Commercial Hearing Aids and Integrated Circuits", *International Hearing Aid Research Conference (IHCON)*, (Lake Tahoe, CA),(2004), 1-8.
Maxwell, J. A., et al., "Reducing Acoustic Feedback in Hearing Aids", *IEEE Transactions on Speech and Audio Processing*, 3(4), (Jul. 1995), 304-313.
Rife, D., et al., "Transfer-Function Measurement With Maximum-Length Sequences", *J. Audio Eng. Soc.*, 37(6), (1989), 419-444.

* cited by examiner

*Primary Examiner*—Brian Ensey
*Assistant Examiner*—Sunita Joshi
(74) *Attorney, Agent, or Firm*—Schwegman, Lundberg & Woessner, P.A.

(57) ABSTRACT

Method and apparatus for determination of gain margin of a hearing assistance device under test. In varying examples, the impulse response for multiple levels can be taken and used to arrive at a gain margin. The method and apparatus, in various examples, process critical portions of the resulting data for efficient processing and to increase accuracy of measurements. The method and apparatus performing a plurality of measurements to determine impulse responses and to derive gain margin as a function of frequency therefrom. The present subject matter includes principles which may are adapted for use within a hearing assistance device using a single white noise stimulus, according to one example. The principles set forth herein can be applied to occluding and non-occluding hearing device embodiments. Additional method and apparatus can be found in the specification and as provided by the attached claims and their equivalents.

25 Claims, 5 Drawing Sheets

FIGS. 2A (top), 2B (middle), and 2C (bottom).

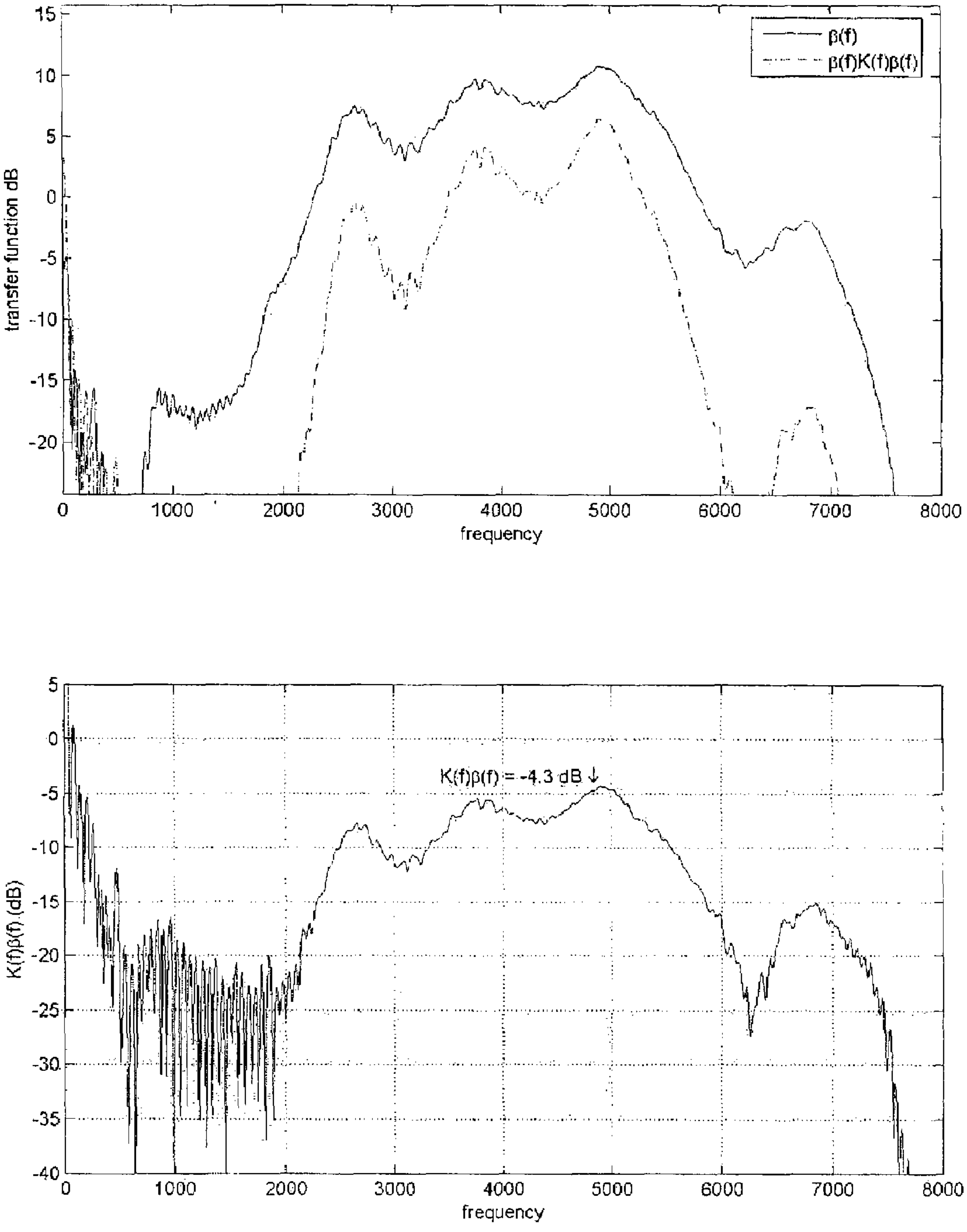
FIGS. 6A (top) and 6B (bottom)

METHOD AND APPARATUS FOR MEASUREMENT OF GAIN MARGIN OF A HEARING ASSISTANCE DEVICE

TECHNICAL FIELD

This disclosure relates generally to hearing assistance devices, and more particularly to measurement of gain margin in hearing assistance devices.

BACKGROUND

Hearing assistance devices, such as hearing aids, amplify received sound to assist the hearing of the wearer. Modem devices tailor the amplification to attempt to restore natural hearing to the wearer of the device. In the case of hearing aids, a microphone receives sound, processes it to meet the needs of the wearer, and produces audible sound to the wearer's ear using a receiver, also known as a speaker. Some hearing aids are designed to occlude the ear canal, and thereby reduce the amount of sound transmitted back from the receiver to the microphone. In such devices, attenuation of sound reaching the microphone from the receiver is used to prevent feedback from becoming oscillation. This allows the hearing aid to use more amplification without ringing or squealing oscillations.

Some devices use a non-occluding approach, whereby amplified sound is provided to the ear canal, but in a way where an open passageway for sound is provided to the ear. Such designs must be careful with use of gain, since there is a higher probability that sound from the receiver will feed back into the microphone of the hearing aid as oscillations.

In both occluding and non-occluding devices, determination of the amount of amplification that can be used, or gain margin, before oscillating is difficult. One way this is done is to reduce gain of the device until oscillations disappear. Such an approach is crude and inefficient since gain margins vary over the sound hearing frequency ranges. Thus, if not done properly, the frequencies most likely to result in oscillation limit the available gain for the remainder of the hearing frequencies.

What is needed in the art is an improved system for determining the amount of available gain margin as a function of frequency. The system should be straightforward to implement in uses with hearing assistance devices.

SUMMARY

The above-mentioned problems and others not expressly discussed herein are addressed by the present subject matter and will be understood by reading and studying this specification.

The present subject matter provides method and apparatus for determination of gain margin of a hearing assistance device under test. In varying embodiments, the impulse response for multiple levels can be taken and used to arrive at a gain margin. The method and apparatus, in various embodiments, process critical portions of the resulting data for efficient processing and to increase accuracy of measurements. The method and apparatus performing a plurality of measurements to determine impulse responses and to derive gain margin as a function of frequency therefrom.

The present subject matter includes principles which may are adapted for use within a hearing assistance device using a single white noise stimulus, according to one embodiment. Such teachings can be applied to occluding and non-occluding hearing device embodiments.

This Summary is an overview of some of the teachings of the present application and not intended to be an exclusive or exhaustive treatment of the present subject matter. Further details about the present subject matter are found in the detailed description and appended claims. Other aspects will be apparent to persons skilled in the art upon reading and understanding the following detailed description and viewing the drawings that form a part thereof, each of which are not to be taken in a limiting sense. The scope of the present invention is defined by the appended claims and their legal equivalents.

BRIEF DESCRIPTION OF THE DRAWINGS

FIG. 6A is a plot of frequency domain profiles for a first pulse of the impulse response and a second pulse of the impulse response, according to one embodiment of the present subject matter.

FIG. 6B is a plot of gain margin based on a deconvolution of the curves of FIG. 6A, according to one embodiment of the present subject matter.

DETAILED DESCRIPTION

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

The present subject matter relates to methods and apparatus for measurement of gain margin of a hearing assistance device. In various embodiments, the measurement can be done in a testing environment. In such embodiments, the method and apparatus can estimate the gain margin product from three impulse response measurements with a hearing assistance device set at different amplification levels. In various embodiments the measurement can be done in a hearing assistance device, such as a hearing aid. In such embodiments, the method and apparatus can measure the gain margin product within a hearing aid with a single measurement. The method and apparatus set forth herein are demonstrative of the principles of the invention, and it is understood that other method and apparatus are possible using the principles described herein.

Measurement of Gain Margin from Outside of the Device

Figure 1:
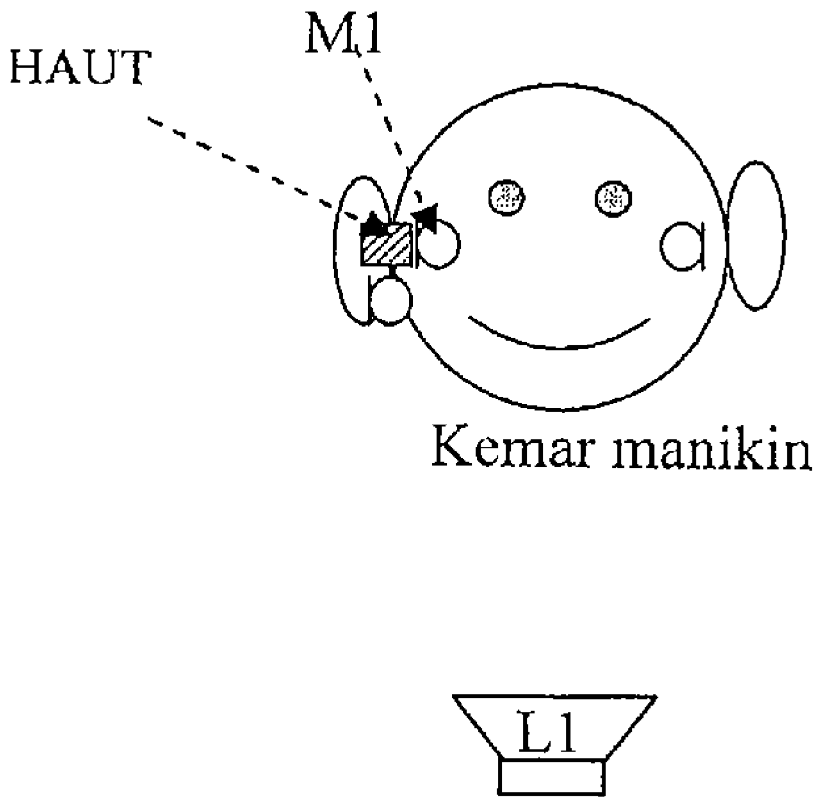
FIG. 1 shows a measurement set up using a subject or KEMAR manikin, according to various embodiments of the present subject matter.

One approach for measuring sound, according to various embodiments, includes:

1) placing a subject or KEMAR manikin within a measurement set up as shown in FIG. 1.

2) placing a hearing assistance device to be tested in the subject/KEMAR manikin with a probe microphone M1 placed in the ear canal 3) setting parameters of the hearing assistance device to make the hearing assistance device linear across normal sound ranges 4) applying a stimulus (for example, white noise signal with 8 KHz bandwidth and duration from about 4 seconds to about 20 seconds) using loudspeaker L1 at three hearing assistance device levels (for example, at: −75 dB or “mute level”, −20 dB or “low level”, and −10 dB or “high level”)

5) recording samples of sound from M1 for each stimulus 6) storing each recording as an array of measured impulse response samples, creating a mute level array, a low level array, and a high level array 7) processing the stored arrays, as follows:

a. Subtract the mute level array from the low level array to create a processed low level array b. Subtract the mute level array from the high level array to create a processed high level array c. Determine a scaling factor between the processed low level array and the processed high level array d. Scale the processed low level array with the scaling factor to create a scaled processed low level array e. Determine the difference between the processed high level array and the scaled processed low level array to create a feedback-only processed high level array f. Segment the processed high level array into leakage, hearing amplification, and first feedback part g. Take the hearing amplification segment from the processed high level array, zero-pad it with zeros to create a N-sample high level amplification array, where N is typically a power of 2 h. Take the first feedback part segment of the feedback-only processed high level array, zero-pad it with zeros to create a N-sample high-level feedback array i. Convert the high-level amplification array and the high-level feedback array to the frequency domain j. Deconvolve the frequency domain high-level feedback array with the high level amplification array to produce a gain margin profile as a function of frequency The resulting gain margin profile will have (N/2)+1 samples, where N is the number of samples in the frequency transform, such as a fast Fourier transform (FFT).

In one embodiment, the measurement sequence includes a stimulus, such as white noise signal with bandwidth 8 kHz, played on the first output channel (connected to loudspeaker L1) of an Echo Gina 24 soundcard made by Echo Digital Audio Corporation of Carpinteria, Calif., while both inputs are recorded. Other soundcards/data acquisition cards may be used without departing from the scope of the present subject matter. A stimulus is played through loudspeaker L1. Microphone M1 is recorded. The hearing assistance device can be linked to a programmer to set the parameters. The hearing assistance device is programmed to operate in the linear range. Such a measurement is done at three levels of the hearing assistance device. The actual levels may vary, but some that have been used successfully include: mute level (sliders at, for example, −75 dB); low level (sliders at, for example, −20 dB); and high level (sliders at, for example, −10 dB). The actual settings may vary without departing from the scope of the present subject matter.

The recorded microphone signal M1 and the original stimulus are used to calculate the impulse responses of the three measurements. The transfer functions of these impulse responses are called $H_{zero}(f)$, $H_{low}(f)$, and $H_{high}(f)$. The impulse response is calculated from the stimulus and recorded samples using a number of approaches including, but not limited to, a Wiener filter or an adaptive filter (NLMS/FDAF). Some methods and apparatus to do this are found in *Adaptive Filter Theory* ($4^{th}$ Edition)(Hardcover) by Simon Haykin, Prentice Hall, 2001. Other methods and apparatus can be found in various other texts on the subject.

Mathematical Treatment

Figure 2:
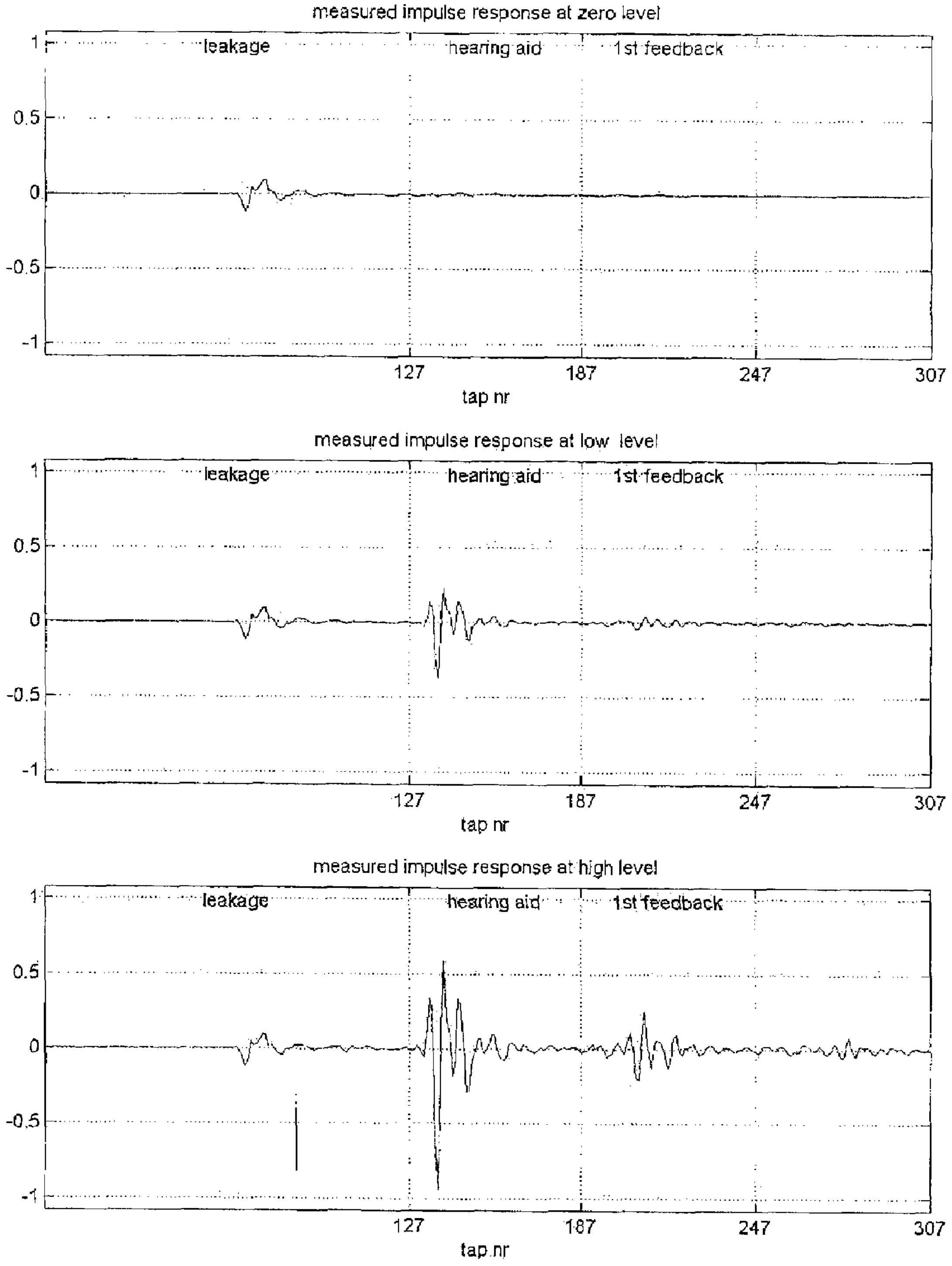
FIGS. 2A, 2B, and 2C are graphs of measured impulse responses at mute, low, and high levels respectively, according to various embodiments of the present subject matter.

An example of the measured impulse responses is shown in FIGS. 2A, 2B, and 2C. In the example shown, a 308 tap FIR filter using a sampling frequency of about 16 kHz is employed to demonstrate the present subject matter.

FIG. 2A shows the impulse response at mute level. Hence, this is the impulse response of the leakage. The energy of the impulse response is mainly located at the beginning of the impulse response.

FIG. 2B, the middle graph, shows the impulse response at low level. Besides the leakage, the impulse response caused by the hearing assistance device is also showing. This response is located at a later time in the impulse response because of the processing delay of the hearing assistance device.

FIG. 3B, the bottom graph, shows the impulse response at a high level. Besides the impulse responses due to leakage and the hearing aid, it also shows the impulse response caused by the feedback and reprocessing of the hearing aid. This response is again located at a later time due to the two processing delays.

From these three impulse responses, the gain margin $|K_{high}(f)\beta(f)|$ can be calculated because the following relations are true (stated in frequency domain):

$$H_{Zero}(f)=L(f) \quad [1]$$

$$H_{Low}(f)=L(f)+H_1(f)K_{low}(f)H_2(f)+H_1(f)K_{low}(f)\beta(f)K_{low}(f)H_2(f) \quad [2]$$

$$H_{High}(f)=L(f)+H_1(f)K_{high}(f)H_2(f)+H_1(f)K_{high}(f)\beta(f)K_{high}(f)H_2(f) \quad [3]$$

$$K_{low}(f)=\alpha K_{high}(f),\ \text{where } \alpha<1 \quad [4]$$

Here L(f) is the forward leakage, $H_1(f)$ is the transfer function from loudspeaker to microphone of the hearing aid, $H_2(f)$ is the transfer function from receiver of hearing aid to microphone M1, and $\alpha$ is the proportionality factor between the low and high level. The proportionality factor $\alpha$ can be read from the settings of the hearing aid or it can be calculated from the second part of the impulse responses of $H_{low}(f)$ and $H_{high}(f)$.

Substituting Equation $$K_{low}(f)=\alpha K_{high}(f),\ \text{where } \alpha<1 \quad [4]$$

in Equation $$H_{low}(f)=L(f)+H_1(f)K_{low}(f)H_2(f)+H_1(f)K_{low}(f)\beta(f)K_{low}(f)H_2(f) \quad [2]$$

and subtracting Equation $$H_{Zero}(f)=L(f) \quad [1]$$

from Equation $$H_{low}(f)=L(f)+H_1(f)K_{low}(f)H_2(f)+H_1(f)K_{low}(f)\beta(f)K_{low}(f)H_2(f) \quad [2]$$

and Equation $$H_{High}(f)=L(f)+H_1(f)K_{high}(f)H_2(f)+H_1(f)K_{high}(f)\beta(f)K_{high}(f)H_2(f) \quad [3]$$

results in:

$$H_{low}(f)-H_{Zero}(f)=\alpha H_1(f)K_{high}(f)H_2(f)+\alpha^2 H_1(f)K_{high}(f)\beta(f)K_{high}(f)H_2(f) \quad [5]$$

$$H_{high}(f)-H_{Zero}(f)=H_1(f)K_{high}(f)H_2(f)+H_1(f)K_{high}(f)\beta(f)K_{high}(f)H_2(f) \quad [6]$$

Hence it is possible to estimate $H_1(f)K_{high}(f)\beta(f)K_{high}(f)H_2(f)$ and $H_1(f)K_{high}(f)H_2(f)$. Deconvolving $H_1(f)K_{high}(f)\beta(f)K_{high}(f)H_2(f)$ with $H_1(f)K_{high}(f)H_2(f)$ results in:

$$|K_{high}(f)\beta(f)| = \left|\frac{H_1(f)K_{high}(f)\beta(f)K_{high}(f)H_2(f)(H_1(f)K_{high}(f)H_2(f))^*}{(H_1(f)K_{high}(f)H_2(f))^*(H_1(f)K_{high}(f)H_2(f))+\varepsilon}\right|. \quad [7]$$

Figure 3:
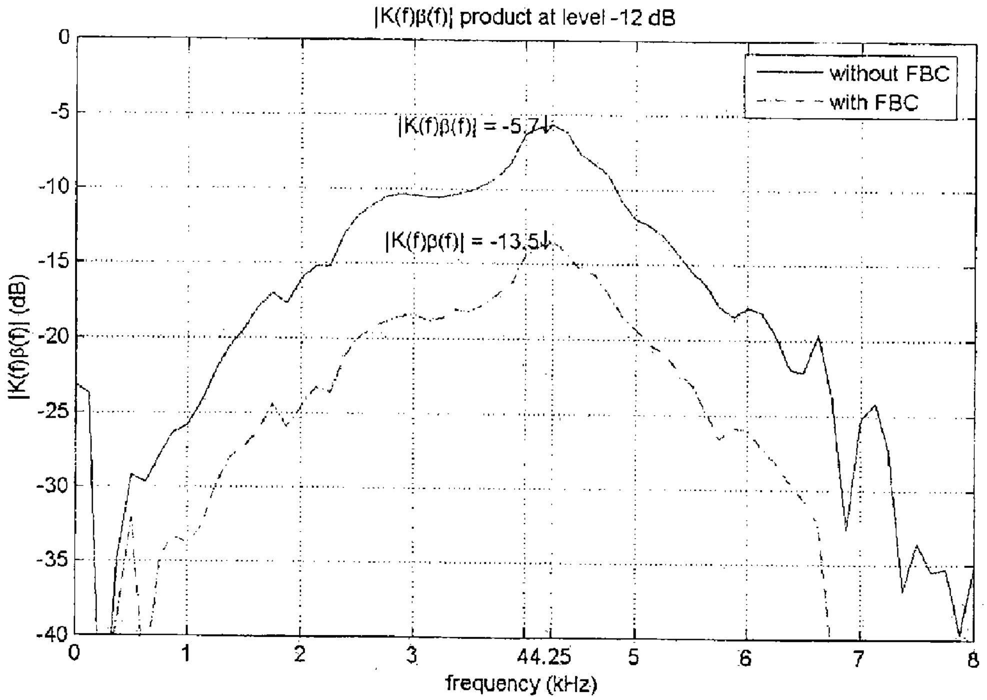
FIG. 3 is a frequency chart showing gain margin for feedback cancellation on and feedback cancellation off, according to various embodiments of the present subject matter.

Here, * is the conjugate operator and 68 is normalization constant. FIG. 3 shows the product $|K_{high}(f)\beta(f)|$ for the hearing assistance device with and without feedback cancellation (FBC).

The product $|K_{high}(f)\beta(f)|$ is relative to the high level (for example for a device set such that a high level =−12 dB). The product is −5.7 dB for the hearing assistance device without feedback cancellation, which means that the hearing assistance device becomes unstable at level −12 dB+5.7=−6.3 dB at frequency f=4.25 kHz. This has been confirmed with a measurement at that particular level.

The gain margin is −13.5 dB for the hearing assistance device with feedback cancellation. This means that the hearing assistance device would become unstable at level −12+13.5 dB=1.5 dB at frequency =4.25 kHz. Thus, the present approach gives more information than a simple device test, since for the device its maximum level is 0 dB.

According to this embodiment, the measurement method can estimate the level and the frequency at which the hearing assistance device becomes unstable from measurements at three levels of amplification in the hearing assistance device. Hence it is not necessary to search for this level manually. Furthermore these measurements give more insight in the feedback system than the PCR metric. The present measurements can provide, among other things, an objective measure of gain margin as a function of frequency without an exhaustive search for the correct amplication factor, and a measure of gain margin of hearing assistance devices with limited (by hardware or software design) gain.

In one embodiment, levels are selected automatically and the gain margin measurements are automated. In various applications, automation is facilitated by levels that are hearing assistance device independent. If the hearing assistance device contains a feedback canceler which can be disabled, it is possible to measure the added stable gain and the amount of feedback cancellation. Such measurements show, among other things, the efficacy of the feedback canceler.

Measuring Gain Margin within the Hearing Assistance Device

Figure 4:
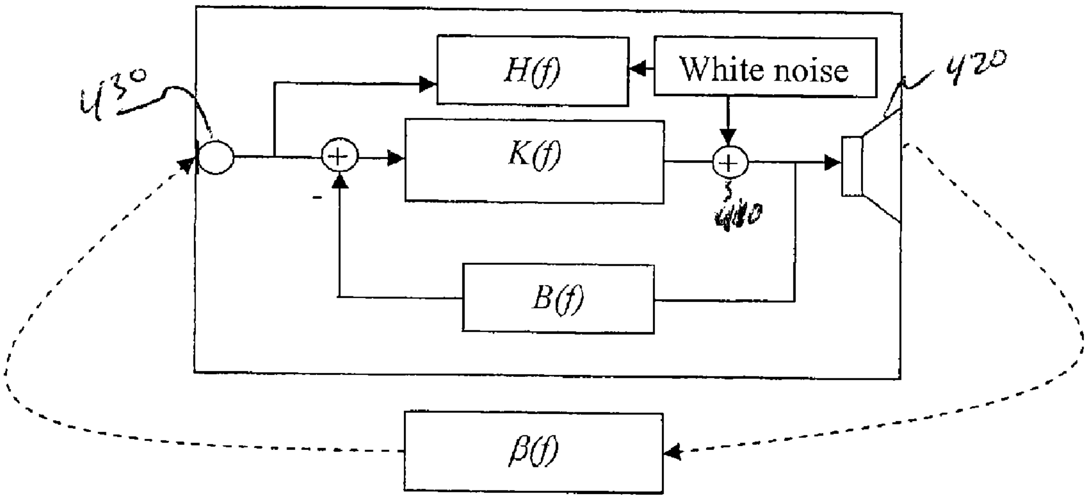
FIG. 4 is a hearing assistance device according to one embodiment of the present subject matter.

The aforementioned principles were applied to develop methods to measure the gain margin from within the hearing assistance device. In one embodiment, a hearing assistance device is configured as demonstrated in FIG. 4. The hearing assistance device of FIG. 4 is configured to measure $|K_{high}(f)\beta(f)|$ product in the hearing assistance device, where B(f) is the feedback canceler and H(f) is the impulse response to be measured. The block entitled β(f) is the acoustic feedback path, K(f) is a transfer function for a hearing assistance device, such as a hearing aid. The K(f) block may be embodied in hardware, software, or in combinations of each. The white noise is provided to summer 410 and to the impulse response module H(f). A microphone 430 and receiver 420 are shown.

The references to a stylized "f" in the variables imply that the processing done in each block is in the frequency domain. It is noted that some of the details of conversion from time domain signals (such as from microphone 430) to frequency domain signals, and vice-versa, were omitted from the figures to simplify the figures. Several known approaches exist to digitize the data and convert it into frequency domain values. For example, in various embodiments overlap-add structures (not shown) are available to assist in conversion to the frequency domain and, from frequency domain back into time domain. Some such structures are shown, for example, in *Adaptive Filter Theory* ($4^{th}$ Edition) by Simon Haykin, Prentice Hall, 2001 and *Real Time Realization of Large Adaptive Filters*, G. P. M. Egelmeers, Eindhoven Technical University of Technology, Ph.D. Thesis, November, 1995.

A white noise signal is added to the receiver signal and the microphone signal is recorded. The impulse response, H(f), is calculated from the microphone signal and white noise signal. The impulse response is calculated from the white noise stimulus and recorded microphone samples using a number of approaches including, but not limited to, a Wiener filter or an adaptive filter (NLMS/FDAF). Some methods and apparatus to do this are found in *Adaptive Filter Theory* ($4^{th}$ Edition) by Simon Haykin, Prentice Hall, 2001. Other methods and apparatus can be found in various other texts on the subject.

Gain Margin Calculation with unknown Gain

When measured using the system of FIG. 4, the impulse response has again two clearly distinctive parts. The first part is equal to the feedback path, β(f), and the second part is the reprocessed part which is equal to (β(f)−B(f))K(f)β(f). White noise is played directly to the receiver of the hearing assistance device, as shown in FIG. 4. Because there is no forward leakage (forward leakage here meaning sound arising from the external loudspeaker to the eardrum), β(f) and (β(f)−B(f))K(f)β(f) can be calculated using a number of approaches. One approach is to use two measurements whereby the first part, β(f), is produced by muting the processing in the hearing assistance device (e.g., K(f)=0), and then the second part (β(f)−B(f))K(f)β(f), is produced by setting K(f) to a typical gain of the hearing assistance device.

Another approach is to use a single measurement whereby K(f) is set to a typical gain and a white noise stimulus is injected as shown in FIG. 4. In varying embodiments, the white noise stimulus has a duration of between about 2 to about 6 seconds. In one example, a white noise stimulus of about 4 seconds is injected to estimate gain margin. Other stimulus durations may be used without departing from the scope of the present subject matter. Such durations may be shorter than the previous approach using an external loudspeaker. As the white noise is applied, the impulse response to the stimulus is recorded. An array of values is generated for the impulse response, which is demonstrated graphically by FIG. 5. The first pulse is representative of the first part, β(f), and the second pulse is representative of the second part, (β(f)−B(f))K(f)β(f). These pulses are distinguishable since white noise is generated and injected within the hearing assistance device, as opposed to white noise received from a loudspeaker. This approach avoids reverberation effects arising from the stimulus bouncing off of walls and the reverberance effect in the ear canal. Both impulse responses are measured for the typical K(f), creating two arrays of impulse information which are indexed in time increments (or taps in a digital filter embodiment). In this example, β(f) can be obtained from taps at or about 24 to about 224 and then the second part, (β(f)−B(f))K(f)β(f), is obtained from taps at or about 806 to about 1006. In various embodiments, zero padding is done before performing a transform. For example, in a transform where N=256 samples are used, zero padding is used to get to 256 samples (taps). An FFT of each peak of both impulse responses is performed (256 samples per peak), which is demonstrated by FIG. 6A. The resulting frequency domain profiles are deconvolved and the resulting gain margin is shown in FIG. 6B.

This test is performed with the device in the patient's ear to avoid feedback. Such a test can be done in the beginning of device use. Additional tests may be done at later times.

In this approach, there is no $H_1(f)$ and no $H_2(f)$ and if K(f) has a short impulse response, then gain margin can be determined in a single measurement. The product (β(f)−B(f))K(f) can be calculated as:

$$(\beta(f)-B(f))K(f)=\frac{((\beta(f)-B(f))K(f)\beta(f))\beta^{*}(f)}{\beta(f)\beta^{*}(f)+\varepsilon}. \qquad [8]$$

Measurement with a Non-Occluding Hearing Assistance Device

Figure 5:
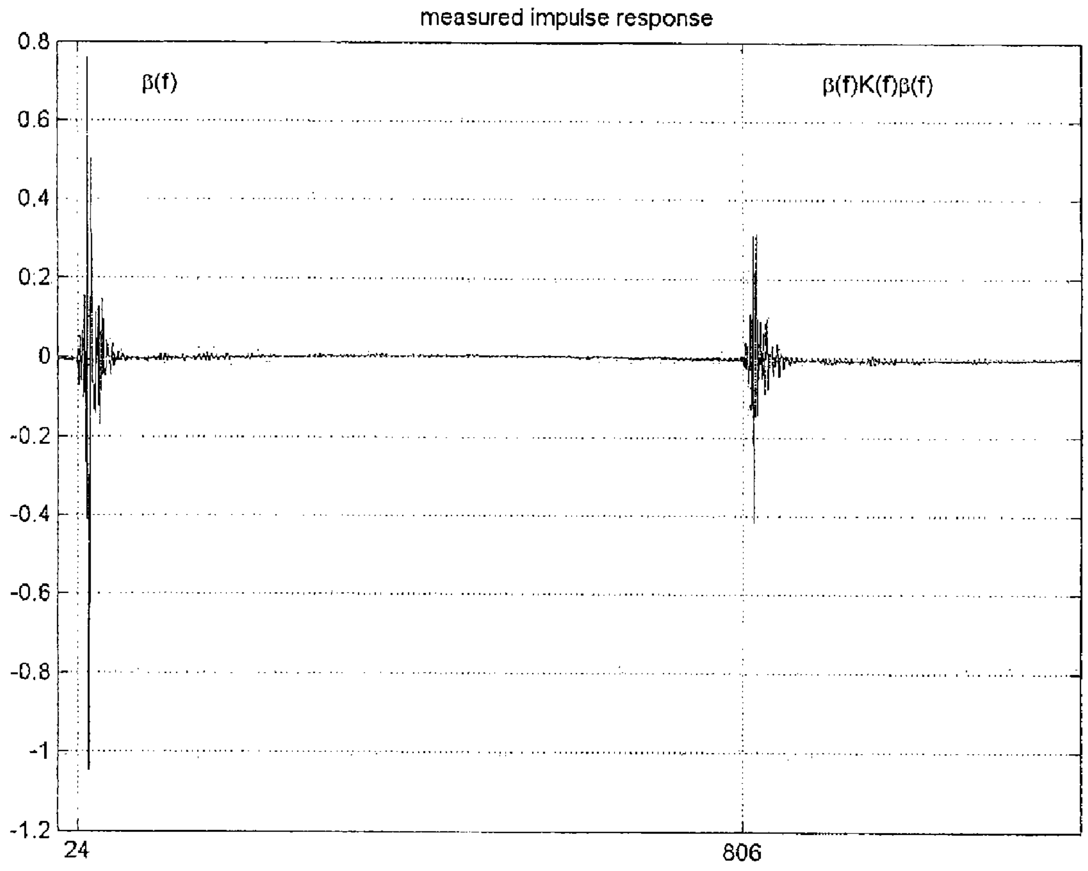
FIG. 5 is a measured impulse response of the system of FIG. 4 according to one embodiment of the present subject matter.

A measurement as described above can be done with a modified non-occluding hearing assistance device. In one test of the application to non-occluding hearing aids, the hearing aid processing was done on a PC with an Echo sound card. For this test, there was no feedback canceler present (B(f)=0). The microphone signal was amplified and sent to the receiver while a white noise source (e.g., Gaussian noise) was added to the receiver signal as shown FIG. 4. The measured impulse response is shown in FIG. 5. The two different parts of the impulse response, β(f) and β(f)K(f)β(f), are clearly distinguishable. The large processing delay is due to the latency of the soundcard. Other soundcards may be used which have smaller latencies and which are comparable to an actual delay in a hearing aid.

The measured transfer functions, β(f) and β(f)K(f)β(f) are calculated from the impulse response and shown in FIG. 6A. These measurements are obtained by an FFT of the windowed pulses of the impulse responses. The feedback is mainly between 2 and 4 kHz and the measurement is not as accurately at lower frequencies due to the presence of noise. Note that the absolute level of feedback is also influenced by the settings of pre-amplifiers etc. and the amplification factor is actually an attenuation factor.

FIG. 6B shows an estimated |K(f)β(f)| based on a deconvolution of the β(f) and β(f)K(f)β(f) curves of FIG. 6A. The estimated |K(f)β(f)| indicates that the feedback will occur when the amplification K(f) of the hearing aid is increased by 4.3 dB at frequency 4.9 kHz. This can be confirmed with another measurement.

These curves show how to calculate the |K(f)β(f)| within a hearing assistance device. Measurements using white noise stimulus generated from about 2 to about 6 seconds have been shown to give a reliable deconvolution. The durations of the white noise stimulus vary, and other durations may be used without departing from the scope of the present subject matter.

Thus, the present measurement method can estimate the level and the frequency at which the hearing assistance device becomes unstable from a single measurement at a high level of amplification in the hearing assistance device.

It is understood that the term "array" used herein is not intended to be limited to a particular data storage structure. Consequently, any data storage structure which can accomplish the principles set forth herein is contemplated by the present subject matter.

It is further understood that the principles set forth herein can be applied to a variety of hearing assistance devices, including, but not limited to occluding and non-occluding applications. Some types of hearing assistance devices which may benefit from the principles set forth herein include, but are not limited to, behind-the-ear devices, over-the-ear devices, on-the-ear devices, and in-the ear devices, such as in-the-canal and/or completely-in-the canal hearing assistance devices. Other applications beyond those listed herein are contemplated as well.

CONCLUSION

This application is intended to cover adaptations or variations of the present subject matter. It is to be understood that the above description is intended to be illustrative, and not restrictive. Thus, the scope of the present subject matter is determined by the appended claims and their legal equivalents.

What is claimed is:

1. A method for measurement of gain margin of a hearing assistance device having a receiver and a microphone, comprising:

receiving sound signals with the microphone for processing in a system;

injecting white noise into a forward feed of the system, the white noise played by the receiver;

processing samples of the signals received by the microphone and the white noise to produce a measured impulse response, the measured impulse response having a first peak and a second peak;

transforming the first peak and the second peak of the measured impulse response into the frequency domain, generating a first peak profile and a second peak profile; and deconvolving the first peak profile and the second peak profile to produce a gain margin as a function of frequency.

2. The method of claim 1, wherein injecting white noise includes generating a white noise stimulus for a duration of about 2 seconds to about 6 seconds.

3. The method of claim 2, wherein the white noise stimulus duration is about 4 seconds.

4. The method of claim 1, wherein transforming includes zero padding.

5. The method of claim 1, wherein transforming includes performing a fast Fourier transform.

6. The method of claim 1, further comprising adjusting parameters of the hearing assistance device based on the gain margin.

7. An apparatus for a subject having an ear canal, comprising:

a hearing assistance device housing adapted for insertion in the ear canal;

a microphone mounted within the housing;

a signal processor adapted to receive signals from the microphone; and a receiver connected to the signal processor and mounted within the housing, wherein the signal processor is adapted to produce white noise for injection to the receiver, the signal processor adapted to execute instructions to determine gain margin while feedback cancellation is on and using the white noise and signals received from the microphone.

8. The apparatus of claim 7, wherein the signal processor comprises a digital signal processor.

9. The apparatus of claim 8, wherein the signal processor includes means for transforming portions of an impulse response into frequency domain profiles.

10. The apparatus of claim 9, wherein the signal processor includes means for deconvolving the frequency domain profiles to determine gain margin.

11. The apparatus of claim 8, wherein the digital signal processor is adapted to perform instructions for hearing aid signal processing.

12. A method for measuring gain margin using a subject having an car and an ear canal, comprising:

placing a probe microphone in the ear canal;

placing a hearing assistance device in the ear;

programming the hearing assistance device to operate in a linear mode;

repeating for different gain levels associated with mute, low, and high levels, comprising the following:

playing a white noise stimulus using a loudspeaker;

recording a response using the probe microphone; and determining an impulse response from the stimulus and recording;

subtracting the mute level impulse response from the low level impulse response to produce a processed low level impulse response;

subtracting the mute level impulse response from the high level impulse response to produce a processed high level impulse response;

determining a scaling factor between the processed low level impulse response and the processed high level impulse response;

scaling the processed low level impulse response with the scaling factor to create a processed low level impulse response;

determining differences between the processed high level impulse response and the scaled processed low level impulse response to create a feedback only processed high level array;

segmenting the processed high level impulse response into a first array associated with leakage, a second array associated with amplification, and a third array associated with a first feedback;

zero padding the second array to produce an N-sample fourth array;

zero padding the third array to produce an N-sample fifth array;

converting the fourth array into a first frequency domain representation;

converting the fifth array into a second frequency domain representation; and deconvolving the first and second frequency domain representations to determine gain margin.

13. The method of claim 12, wherein the white noise stimulus has a duration of about 4 seconds to about 20 seconds.

14. The method of claim 12, wherein the white noise has a bandwidth of about 8 KHz.

15. The method of claim 12, wherein the mute level is a hearing assistance device gain of about −75 dB.

16. The method of claim 12, wherein the low level is a hearing assistance device gain of about −20 dB.

17. The method of claim 12, wherein the high level is a hearing assistance device gain of about −10 dB.

18. An apparatus for a subject having an ear canal, comprising:

a sound delivery device adapted for non-occluding use for the ear canal;

a receiver for producing sound, acoustically coupled to the sound delivery device;

a microphone; and a signal processor connected to receive signals from the microphone and adapted for communication with the receiver;

wherein the signal processor is adapted to produce white noise for injection to the receiver, to execute instructions to determine gain margin while feedback cancellation is on and using the white noise and signals received from the microphone.

19. The apparatus of claim 18, wherein the signal processor comprises a digital signal processor.

20. The apparatus of claim 19, wherein the signal processor includes means for transforming portions of an impulse response into frequency domain profiles.

21. The apparatus of claim 20, wherein the signal processor includes means for deconvolving the frequency domain profiles to determine gain margin.

22. The apparatus of claim 18, adapted for use in a behind-the-ear hearing aid.

23. The apparatus of claim 18, adapted for use in an over-the-ear hearing aid.

24. The apparatus of claim 18, adapted for use in an on-the-ear hearing aid.

25. The apparatus of claim 18, adapted for use in an in-the-ear hearing aid.

* * * * *

UNITED STATES PATENT AND TRADEMARK OFFICE
CERTIFICATE OF CORRECTION

PATENT NO. : 7,664,281 B2
APPLICATION NO. : 11/276543
DATED : February 16, 2010
INVENTOR(S) : Ivo Merks It is certified that error appears in the above-identified patent and that said Letters Patent is hereby corrected as shown below:

In column 9, line 18, in Claim 12, delete "car" and insert -- ear -n-, therefor.

Signed and Sealed this

Twenty-fifth Day of May, 2010

David J. Kappos
*Director of the United States Patent and Trademark Office*

UNITED STATES PATENT AND TRADEMARK OFFICE

CERTIFICATE OF CORRECTION

PATENT NO. : 7,664,281 B2
APPLICATION NO. : 11/276543
DATED : February 16, 2010
INVENTOR(S) : Ivo Leon Diane Marie Merks It is certified that error appears in the above-identified patent and that said Letters Patent is hereby corrected as shown below:

Title page, item (*) Notice: should read as follows: Subject to any disclaimer, the term of this patent is extended or adjusted under 35 U.S.C. 154(b) by 957 days.

Signed and Sealed this

Twenty-fourth Day of August, 2010

David J. Kappos
*Director of the United States Patent and Trademark Office*